Aug. 3, 1965  A. W. QUICK ETAL  3,197,961
PUMP CONTROLLED DRIVE SYSTEM
Original Filed March 7, 1957  2 Sheets-Sheet 2
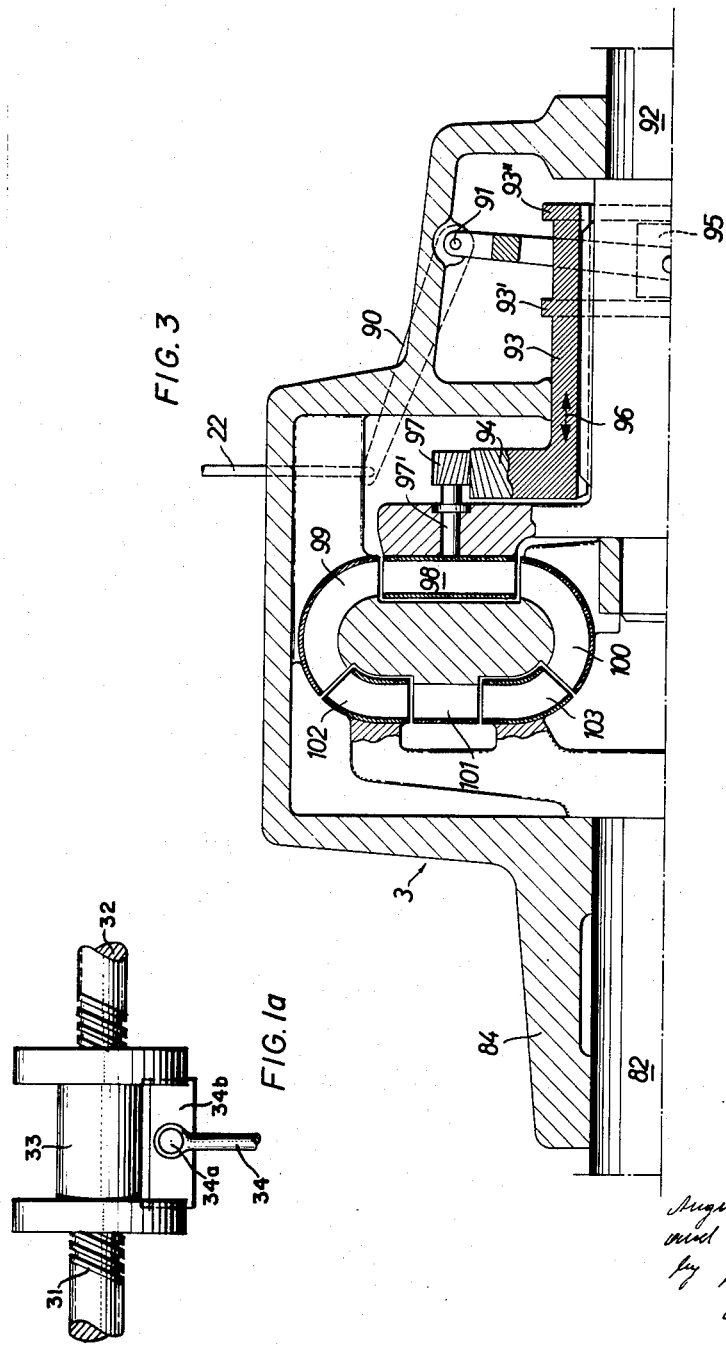
Inventors
August Wilhelm Quick
and Hans Lindemann
By Michael S. Striker
Attorney

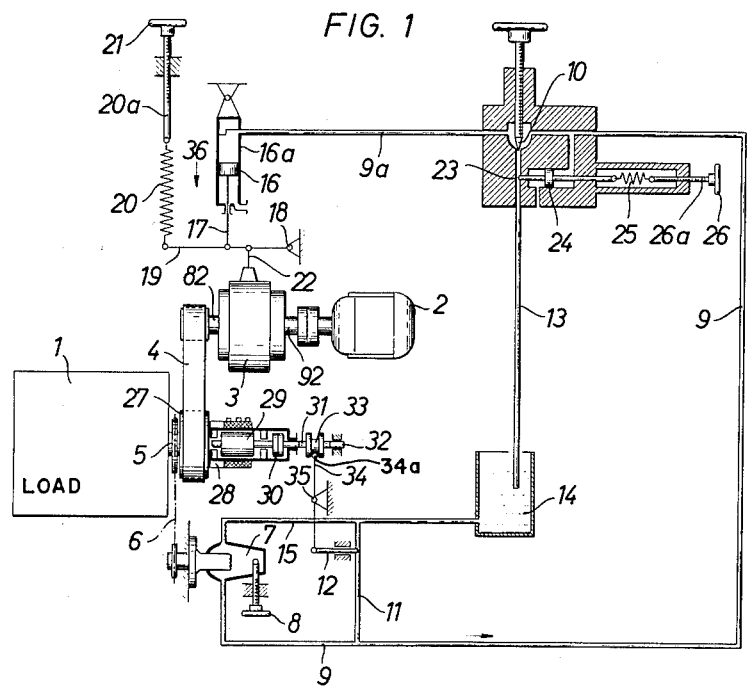

United States Patent Office

3,197,961
Patented Aug. 3, 1965

3,197,961
PUMP CONTROLLED DRIVE SYSTEM
August Wilhelm Quick, Aachen, and Hans Lindemann, Bielefeld, Germany, assignors to Th. Calow & Co., Bielefeld, Germany
Original application Mar. 7, 1957, Ser. No. 644,516, now Patent No. 3,009,323, dated Nov. 21, 1961. Divided and this application Nov. 1, 1961, Ser. No. 149,373
Claims priority, application Germany, Mar. 28, 1956, C 12,802; Dec. 7, 1956, C 14,090; Feb. 4, 1957, C 14,342
12 Claims. (Cl. 60—53)

The present application is a divisional application of the copending application "Driving Systems for Machine Tools," Serial No. 644,516 filed March 7, 1957, now issued as U.S. Patent 3,009,323.

The present invention relates to a pump controlled drive system, and more particularly to a pump controlled drive system for driving a machine tool at a desired constant speed irrespective of load variations.

It is known to drive machines and machine tools by drive systems obtaining this result, for example by electric Ward-Leonard drive, by infinitely variable polyphase induction motors and the like, or by prime movers having a substantially constant speed and driving an infinitely variable transmission. The known drive systems are either very expensive, or have a short span of life, or do not react sufficiently fast to rapid load and speed variations.

It is one object of the present invention to provide a drive system by which any speed variations caused by load variations, are rapidly compensated by an adjustment of the output torque of the drive systems resulting in an adjustment to the desired constant speed.

For example, if a bar or tube of a certain diameter is to be machined, the speed of rotation should change as little as possible during the operation even though the feed and thus the cutting output might be changed.

Another object of the present invention is to provide in addition to means which automatically adjust the speed of the drive means, additional control means which effect a more rapid adjustment than would be obtained by the speed responsive adjusting means.

In one embodiment of the invention, a pump is driven from the output shaft of the drive means and circulates an operating liquid through conduit means. A hydraulic pressure-responsive control element is connected to adjusting means which vary the output torque of the output shaft of the drive means so that the drive means are adjusted in accordance with the pressure in the conduit means. In this manner, speed variations of the output shaft of the drive means caused by a variation of the load torque, are compensated.

However, in order to effect a more rapid control operation, in accordance with the present invention control means are provided for reducing or increasing the pressure in the conduit means in response to speed variations of the output shaft of the drive means beyond the pressure reduction or pressure increase by the pump in response to the speed variation of the output shaft.

In this manner, the pressure acting on the control element which operates the adjusting means of the drive means is more rapidly increased, or decreased, respectively, than the pressure produced in said conduit means by said pump due to undesired speed variations of the output shaft. Consequently, the drive means is rapidly adjusted by the adjusting means when the speed of the output shaft varies due to load variations.

In the preferred embodiment of the invention, the drive means include a prime mover, and torque converter means whose torque can be adjusted by suitable adjusting means, for example by turning of the impeller blades of an impeller cooperating with turbine. If the torque converter includes a turbine and a nozzle projecting a stream of liquid against the turbine, the adjusting means control the nozzle opening.

The control means by which a fast response to load variations is obtained in accordance with the invention include a valve member located in the conduit means and being hydraulically operated by liquid in the conduit means so as to assume a normal position when the pressure in the conduit means is normal corresponding to a desired speed of the output shaft and of the pump which circulates the operating liquid in the conduit means. When the pressure in the conduit means is increased or reduced due to a speed increase or speed reduction of the output shaft of the pump, the control valve member reduces or increases, respectively, the cross section of the conduit when the pressure in the conduit means increases or decreases, so that the hydraulic control element is more rapidly operated as if its operation would only be caused by the pressure produced by the pump corresponding to speed variations of the output shaft.

The valve member is spring-biased and controlled by a hydraulic piston which will very rapidly respond to pressure variations caused by speed variations of the pump and of the output shaft. Consequently, the valve member will respond to rapid accelerations and decelerations of the output shaft to obtain a very fast correction and adjustment.

However, if the speed changes of the output shaft and of the pump are very gradual, the piston of the control valve member may not respond. If the output shaft continues to run at the very slightly increased or decreased speed as compared with a normal desired speed, the machine driven by the output shaft will not be properly operated, since the control means do not respond.

In accordance with the present invention other control means are provided to compensate very slow and gradual speed variations of the output shaft. Another valve element is located in a by-pass conduit connecting inlet and outlet of the pump, and is movable between a normal position and a plurality of control positions for reducing or increasing the pressure in the conduit means by correspondingly reducing or increasing the cross section of the by-pass conduit. A control device includes a first member connected to the output-shaft to rotate at a speed corresponding to the speed of the same, and a second rotary member actuated by the first member to turn in opposite directions through angles proportionate to the difference between the desired speed and increased or reduced speeds of the first member and of the output shaft when the speed of the output shaft is above or below a desired normal speed. The second member is connected to the valve element for moving the same to the control positions thereof for increasing or decreasing, respectively, the pressure in said conduit means when the speed of the output shaft increases or decreases, respectively.

In the preferred embodiment of the invention, the control device is a synchronous motor having a stator member connected to the output shaft while producing a rotary field rotating at a constant speed corresponding to a desired speed of the output shaft relative to the stator member and in a direction opposite to the direction of rotation of the output shaft. The rotor of the synchronous motor is connected to the control valve element, and turns at a speed corresponding to the absolute speed of the rotary field. If the rotary field and the stator member rotate in opposite direction at the same speed, no adjustment takes place, but if the stator lags behind, or turns faster than the rotary speed, then the rotor is actuated to turn and to effect the necessary adjustment.

The desired normal speed is adjusted at the beginning of the operation by a valve means which determines the cross section of the conduit means for the entire operation, so that at a certain speed of the output shaft, a certain pressure prevails in the conduit means and holds the pressure responsive control means and thereby the adjusting means in a normal inoperative position as long as the desired speed of the output shaft is maintained.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a schematic view illustrating a drive system according to the present invention and showing some of the devices in cross section;

FIG. 1a is an enlarged showing of actuator 33 in FIG. 1;

FIG. 2 is a schematic view, partly in section, illustrating a modified embodiment of the invention; and FIG. 3 is a sectional view illustrating a torque-converter used in the embodiment of FIG. 1, and adjusting means therefor.

Referring now to the drawings, and particularly to FIG. 1, a machine tool 1, such as a bar turning machine, peeling machine, or skimming machine is driven by a variable torque converter 3 through a belt 4. Torque converter 3 is driven by a prime mover 2, for example by an electric motor. Torque converter 3 is shown in detail in FIG. 3 by way of example and includes an input shaft 92 connected to the motor 2, and an output shaft 82 on which a pulley driving belt 4 is mounted. Shaft 92 carries a sleeve 93 with a pair of flanges 93' and 93", and with a helical gear 94. A lever 90 is turnable about a shaft 91 in the housing 84 and has a fork-shaped end provided with slide members 95 which are located between flanges 93' and 93", so that, when the lever 90 is pivoted about pivot 91, sleeve 93 will be shifted in the direction of the arrow 91 while turning with shaft 92 due to a suitable key connection.

The helical gear 94 is in meshing engagement with helical pinions 97 secured to shafts 97', so that the turnable blades 98 of the impeller wheel which are secured to shafts 97' may be adjusted by shifting sleeve 93 which takes place when a rod 22 connected to lever 90 is displaced.

Stationary guide vanes 99, 100 and 101 alternate with turbine blades 102 and 103 which together with output shaft 82 constitute the output means of the torque converter.

Referring again to FIG. 1, it will be seen that rod 22 is articulated to a lever 19 which is mounted on a fixed pivot 18 and has connected thereto a piston rod 17 with a piston 16, and a spring 20 which can be tensioned by a threaded spindle 20a under control of a handwheel 21. Piston 16 is located in a cylinder 16a which communicates with a conduit 9a so that an increase of the pressure in conduit 9a will move piston 16 downward in direction of arrow 36 against the action of spring 20, while a decrease of the pressure in conduit 9a will result in upward movement of piston 16 under the action of spring 20. By operation of handwheel 21, the spring can be adjusted to different pressures so that piston 16 remains motionless when a certain pressure prevails in conduit 9a.

As was explained with reference to FIG. 3, movements of piston 16 will result in adjustment of the torque converter 3 to increase or decrease the output torque produced by output shaft 82. In accordance with the present invention, the output torque of the torque converter 3 is automatically increased when the load torque of machine tool 1 increases or decreases whereby the rotary speed of machine tool 1 is maintained at a desired constant speed.

Drive shaft 5 of the machine tool 1 rotates at a speed proportionate to a rotary speed of output shaft 82, and is connected by a chain drive 6 to the shaft of a rotary pump 7 which supplies a certain amount of operating liquid at any speed independent of the back pressure. The desired quantity of circulated liquid can be determined by operation of a handwheel 8. Pump 7 is, for example, a small multiple piston pump with an adjustable stroke of the type conventionally used for infinitely variable hydraulic drives. The outlet of pump 7 discharges into a conduit 9 so that the liquid flows through a manually operated valve 10 into a conduit 13 and is discharged into a container 14 which is connected with the inlet of pump 7 by a conduit 15. A by-pass conduit 11 connects the inlet and outlet of pump 7, and is provided with a control valve element 12 which is operated by a double-armed lever 34 on a fulcrum 35 to vary the free cross section of by-pass conduit 11, or to close the same. A certain pressure will develop in conduit 9a for any position of the operating valve 10, and act on piston 16. Different pressures in conduit 9a will consequently result in different positions of piston 16 corresponding to a different tension of spring 20. In the different positions of piston 16, the adjusting means 22, 90, 94, 97 of the torque converter 3 will be set to different positions, corresponding to different selected speeds of the output shaft 82 to be maintained during the entire operation. Consequently, different desired speeds of the output shaft 82, and of the machine tool 1, can be selected by setting operating valve 10. A control valve member 23 is located in conduit 13, and operated by a piston 24 in a cylinder which communicates with conduit 9. Piston 24 is connected to a spring 25 whose tension can be adjusted by threaded spindle 26a controlled by a wheel 26. When the pressure in conduit 9 increases, control valve member 23 will move to a position reducing the cross section of conduit 13, or closing the same, and when the pressure in conduit 9 drops, spring 25 will retract control valve member 23 to provide a greater free cross section in conduit 13.

The stator 28 of a small synchronous polyphase motor is connected to shaft 5 and pulley 27 for rotation therewith, while rotor 29 is connected by a overload slip clutch 30 to a spindle 32 having a threaded portion 31 on which the inner thread of a flanged nut 33 is mounted. When spindle 32 is turned by rotor 29, nut 33 will travel in axial direction along spindle 32 since a slide part 34b, which is connected by a pivot pin 34a to the free end of lever 34 and mounted in radial slots in the confronting inner faces of the flanges of nut 33, prevents turning of nut 33. Movement of nut 33 will cause a corresponding movement of slide part 34b in axial direction of spindle 31 and turning of lever 34 about fulcrum 35 so that control valve element 12 will be advanced or retracted corresponding to the displacement of nut 33 on spindle 32 and consequently corresponding to the direction of rotation of rotor 29.

Stator 28 has a polyphase winding producing a rotary field which rotates at a constant speed depending on the frequency of the voltage and selected to be equal to a desired rotary speed of shaft 5 but to turn in opposite direction. If stator 28 is at a standstill, the field will rotate and drive the rotor 29. Rotor 29 tends to rotate at the same speed as the rotary field. The rotary field of stator 28 rotates in a direction opposite to the direction of rotation of shaft 5 so that the rotary field does not move relative to rotor 29 if the stator is turned by shaft 5 in one direction of rotation at exactly the same speed as the rotary field turns in the opposite direction of rotation. Since under such conditions the rotary field is at a standstill, rotor 29 is not turned by the rotary field.

If shaft 5 turns stator 28 faster than the rotary speed of the rotary field, then the rotary field will, in effect, slowly travel in the direction of shaft 5. If shaft 5 turns stator 28 slower than the rotary speed of the rotary field, then the rotary field will, in effect, slowly travel in its direction of rotation.

Since rotor 29 follows the rotary field, rotor 29 will turn and slowly travel in one or the other direction at a speed corresponding to the difference between the constant rotary speed of the rotary field, and the variable speed of drive shaft 5. If the speed of drive shaft 5 corresponds to the selected desired speed, which is equal to the speed of the rotary field, rotor 29 will not turn.

As explained above, the turning movements of rotor 29 will effect an adjustment of the position of valve element 12.

The drive system illustrated in FIGS. 1 and 3 operates as follows:

Assuming that the machine 1 is to run at a selected constant speed of, for example 1,000 revolutions per minute, operating valve 10, which is provided with a speed scale, not shown, is set to the selected rotary speed so that a certain cross section for the passage of liquid is provided between conduits 9, 13 and 9a.

When motor 2 is started, control piston 16 will still be in its highest position, since there is no pressure in conduit 9a which could act against the force of spring 20. Consequently, the linkage 17, 19, 22, 90 is operated to set the torque converter 3 to its greatest torque, as is required for the starting operation.

Motor 2 drives the torque converter 3 so that output shaft 82 drives drive shaft 5 of the machine 1, and also pump 7 which discharges the operating liquid into conduit 9 at amounts increasing as the rotary speed of shaft 5 increases. The liquid flows off through conduit 13 at a pressure determined by the position of operating valve 10. This pressure will prevail in conduit 9a and move piston 16 downward against the action of spring 20. As the rotary speed further increases, the pressure in conduit 9 will also increase, piston 16 will further move in the direction of arrow 36 and adjust torque converter 3 to a smaller torque. The control operation is completed when the back pressure in conduit 9a has reached such a magnitude that control piston 16 arrives in its central position and when the torque to which the torque converter 3 is adjusted corresponds to the load torque acting on the output shaft of the torque converter.

During the starting operation, control valve element 12 is fully retracted, since drive shaft 5 and stator 28 turn at a slower speed than the constant rotary speed of the rotary field of 28. Overload clutch 30 prevents any damage to the linkages to control valve element 12.

When the desired selected speed of the machine 1 is obtained, stator 28 rotates at the same rotary speed as the rotary field, but in opposite direction so that rotor 29 is at a standstill.

However, when the desired rotary speed is slightly exceeded, that is when the frequency of the polyphase current supplied to the synchronous motor 28, 29 is slightly lower than the frequency thereof which corresponds to the rotary speed of machine 1, rotor 29 will reverse its direction as compared with its turning direction during the starting operation and will turn spindle 32 so that nut 33 traveling along the same effects advance of control valve element 12 toward a position closing by-pass conduit 11.

The turning speed of rotor 29 will correspond to the difference between the greater speed of stator 28 and the smaller speed of the rotary field. Rotor 29 turns in the same direction as drive shaft 5 when machine 1 turns at the rotary speed greater than the desired selected speed.

As long as by-pass conduit 11 was opened, a part of the operating liquid was circulated by pump 7 through conduit 11. When control valve element closes conduit 11, all the liquid discharged by pump 9 passes through conduits 9 and 13, resulting in an increase of the pressure in conduit 9a so that piston 16 is displaced and controls the adjusting means of the torque converter 3 to reduce the torque of the torque converter. Since the speed of machine 1 was increased due to a reduction of the load torque, the reduction of the output torque of the torque converter will result in equilibrium between the torques, and in rapid return of machine 1 to its desired selected speed.

During the normal operation, control element 12 oscillates about a central position for reducing or increasing the cross section of by-pass conduit 11, and the speed of adjustment depends on the pitch of the thread 31 of spindle 32.

During the above described starting operation, the pressure in conduit 9 is lower than during the normal operational condition of equilibrium, so that piston 24, together with control valve member 23, is held in a retracted position by a spring 25 so that conduit 13 is completely open. When the state of equilibrium is obtained, control valve member 23 is in an intermediate position. In the event that during the operation of the machine 1, a considerable resistance against turning should occur so that the load torque is increased, and the rotary speed of the drive shaft 1 is reduced, pump 7 will turn slower and discharge a lesser amount of liquid into conduit 9 so that the pressure will drop accordingly. As soon as the pressure acting on piston 24 is reduced, spring 25 will retract control valve member 23 to open conduit 13 wider so that the pressure in conduit 13 will be further reduced, resulting in a more rapid actuation of piston 16 and a corresponding adjustment of the torque converter 3 to a greater torque to compensate for the additional load torque. Consequently, the state of equilibrium will be very quickly obtained, whereupon the pressure in conduit 9 will become normal due to the increased speed of pump 7, and a return of control valve member 23 to its normal position.

It will be understood that even if the control valve element 12 and the control valve element 23 were not provided, speed variations of drive shafts 5 of machine tool 1 would result in different speeds of pump 7, and consequently in different pressures acting on piston 16, so that the torque converter would be adjusted to the desired normal speed.

However, due to the additional action of valve member 23, any pressure variation in conduit 9 is amplified so that piston 16 is faster operated as if it were only being controlled by the pressure variations produced by the pump 7. For example, if the pressure in conduit 9 increases due to an unduly increased speed of machine 1 and shaft 5 which drives pump 7, valve member 23 throttles conduit member 13 and very rapidly increases the pressure further resulting in a faster displacement of piston 16 and corresponding adjustment of the torque converter. The control device including control valve member 23 will consequently respond to sudden accelerations and decelerations of the machine 1 to very rapidly effect adjustment of the torque converter. Without this control device, a far greater time would be required before piston 16 responds to the gradually increased, or decreased, pressure produced only by an increased, or decreased, speed of machine 1 and pump 7 under the basic control of operating valve 10.

Control device 28, 29, 12 is not controlled by the pressure in conduit 9, but responds when the speed of the machine 1 is greater than a constant speed represented by the rotary field. When shaft 5 and stator 28 have turned a certain angle relative to the rotor 29, the same will turn and adjust control valve 12. Consequently, even very small speed variations which do not effect a substantial pressure increase or decrease in conduit 9, will add up to displace stator 28 relative to rotor 29 at such an angle that rotor 29 is turned through a corresponding angle. Therefore, it can be said that control device 28, 29, 12 reacts to the angular deviation of drive shaft 5 from the theoretical position it would have if rotating at constant speed. When control element 11 closes bypass 11 to increase the pressure in conduits 9 and 9a, or opens completely by-pass 11 to reduce the pressure in conduits 9, 9a, the pressure in conduits 9, 9a will be more quickly adjusted as compared with action of pump 7 alone which, of course, also increases and decreases the pressure when the speed of shaft 5 is increased or decreased.

In the modified embodiment of FIG. 2, a different turbine 37 is provided, and the impelling input means are provided in the form of a nozzle 40, while a valve member 38 serves as adjusting means for adjusting the output torque of the shaft of turbine 37. Valve 38 is operated by control rod 22' connected to lever 19 of the hydraulic pressure responsive control element which was described with reference to FIG. 1. The input means include a centrifugal pump 400 communicating with nozzle 40, pump 400 being driven by a prime mover, shown to be an electric motor 401.

If control piston 16 engages a stop member 39, the maximum quantitity of liquid will flow through nozzle 40, and thus produce the maximum torque in turbine 37. When control piston 16 is in its other end position, nozzle 40 will be closed so that output torque of turbine 37 will be zero. These conditions will prevail if the turbine is of the type operating at constant pressure. If, however, the turbine is operated by a pump supplying a constant amount of liquid, then the pressure will be a maximum when nozzle 40 is almost closed. Such a pump may be a gear pump, a screw pump, or a piston pump with a constant stroke. In this event, the pressure will be a minimum when nozzle 40 is opened. Accordingly, the torque produced by the turbine will also be greater when the opening of the nozzle 40 is reduced by valve 38. This is due to the fact that if the cross sectional discharge area of the nozzle is reduced, the pressure in front of the nozzle increases, if a pump having a constant output is used. Therefore, the velocity of the liquid discharged from the nozzle also increases accordingly. Since the entire quantity of the liquid supplied by the pump will thus be forced through the nozzle, it impinges on the turbine blades at an increased velocity, and will consequently produce a greater torque.

In this further modified embodiment, however, it will be necessary to provide lever 19 with a spring 20' acting in the opposite direction as compared with spring 20, and supply the pressure fluid from conduit 9 through a conduit 9' rather than through conduit 9a. It will be understood, that even if a pump having a constant output is used, such constant output can be adjusted for different operations, as long as the output remains substantially constant during a desired a speed range.

It will be understood that each of the elements described above or two or more together, may also find a useful application in other types of drive systems for maintaining a machine at a constant speed differing from the types described above.

While the invention has been illustrated and described as embodied in a drive system including a pump and pressure responsive control means responding to the pressure of a liquid circulated by the pump, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A drive system comprising, in combination, drive means including rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the pressure in said conduit means produced by said pump; and control means in said conduit means for reducing or increasing the pressure in said conduit means beyond the pressure reduction or pressure increase produced by said pump pumping at a speed depending on speed variations of said shaft whereby the pressure acting on said pressure responsive control element is more rapidly increased, or decreased, respectively, than the pressure produced in said conduit means by said pump due to speed variations of said shaft; and a control device driven by said shaft independently of said pump and responsive to an angular deviation of said shaft from its angular position at a normal desired speed, said control device being operatively connected to said control means for actuating the same to further increase or decrease, respectively, the pressure in said conduit means when the speed of said shaft is higher or lower than the normal desired speed so that the output torque is rapidly increased, or decreased, by said adjusting means when the speed of said shaft varies due to load variations, whereby the output speed of said output means is maintained substantially constant.

2. A drive system comprising, in combination, drive means including rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the pressure in said conduit means; and control means in said conduit means for reducing or increasing the pressure in said conduit means beyond the pressure reduction or pressure increase relative to the normal pressure produced by said pump in response to speed variations of said shaft relative to the selected speed; a control device including a first member driven from said shaft at a speed corresponding to the speed of the same, and a second member actuated by said first member when the speed of said shaft is above or below a desired normal speed, said second member being connected to said control means for actuating the same to further increase or decrease, respectively, the pressure in said conduit means when the speed of said shaft increases or decreases, respectively, whereby the pressure acting on said pressure responsive control element is more rapidly increased, or decreased, respectively, than the pressure produced in said conduit means by said pump due to speed variations of said shaft so that the output torque is rapidly increased, or decreased, by said adjusting means when the speed of said shaft varies due to load variations, whereby the output speed of said output means is maintained substantially constant.

3. A drive system comprising, in combination, a prime mover, torque-converter means driven by said prime mover and having an output shaft and adjusting means for adjusting the output torque of said output shaft, said shaft being adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the pressure in said conduit means; and control means including a control valve member located in said conduit means and pressure responsive means hydraulically directly connected to said pump and controlling said control valve member to assume a normal position when the pressure in said conduit means is normal corresponding to a desired speed of said shaft and of said pump, and so as to assume control positions gradually reducing or increasing the cross section of said conduit means when the pressure in said conduit means increases or decreases, respectively, corresponding to undesired speed variations of said shaft and of said pump whereby the pressure acting on said pressure responsive control element is more rapidly increased, or decreased, respectively, than the pressure produced in said conduit means by said pump due to speed variations of said shaft so that the output torque is rapidly increased, or decreased, by said adjusting means when the speed of said shaft varies due to load variations, whereby the output speed of said output means is maintained substantially continuously constant.

4. A drive system comprising, in combination, prime mover means; drive means including fluid impelling input means driven by said prime mover means, turbine means having rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the pressure in said conduit means; a valve element located in said conduit means and being movable between a normal position and a plurality of control positions for reducing or increasing the pressure in said conduit means; a control device including a first member driven from said shaft to rotate at a speed corresponding to the speed of the same, and a second rotary member, actuated by said first member to turn in opposite directions when the speed of said shaft is above or below a desired normal speed, said second member being connected to said valve element for moving the same to said control positions for increasing or decreasing, respectively, the pressure in said conduit means when the speed of said shaft increases or decreases, respectively, whereby the pressure acting on said pressure responsive control element is more rapidly increased, or decreased, respectively, than the pressure produced in said conduit means by said pump due to speed variations of said shaft so that the output torque is rapidly increased, or decreased, by said adjusting means when the speed of said shaft varies due to load variations.

5. A drive system comprising, in combination, prime mover means; drive means including fluid impelling input means driven by said prime mover means, turbine means having rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a by-pass conduit connecting inlet and outlet of said pump; a pressure responsive control element connected to said adjusting means and communicating with said conduit means so that said adjusting means and thereby said output means are adjusted in accordance with the pressure in said conduit means; a valve element located in said by-pass conduit of said conduit means and being movable between a normal position and a plurality of control positions for reducing or increasing the cross section of said by-pass conduit for increasing or decreasing, respectively, the pressure in said conduit means; a control device including a first member driven from said shaft to rotate at a speed corresponding to the speed of the same, and a second rotary member actuated by said first member to turn in opposite directions when the speed of said shaft is above or below a desired normal speed, said second member being connected to said valve element for moving the same to said control positions for increasing or decreasing, respectively, the pressure in said conduit means when the speed of said shaft increases or decreases, respectively, whereby the pressure acting on said pressure responsive control element is more rapidly increased, or decreased, respectively, than the pressure produced in said conduit means by said pump due to speed variations of said shaft so that the output torque is rapidly increased, or decreased, by said adjusting means when the speed of said shaft varies due to load variations.

6. A drive system comprising, in combination; drive means including rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a by-pass conduit connecting inlet and outlet of said pump; a pressure responsive control element connected to said adjusting means and communicating with said conduit means so that said adjusting means and thereby said output means are adjusted in accordance with the pressure in said conduit means; a valve element located in said by-pass conduit of said conduit means and being movable between a normal position and a plurality of control positions for reducing or increasing the cross section of said by-pass conduit for increasing or decreasing, respectively, the pressure in said conduit means; a control device including a first member driven from said shaft to rotate at a speed corresponding to the speed of the same, and a second rotary member actuated by said first member to turn in opposite directions when the speed of said shaft is above or below a desired normal speed, said second member being connected to said valve element for moving the same to said control positions for increasing or decreasing, respectively, the pressure in said conduit means when the speed of said shaft increases or decreases, respectively; and control valve means including a control valve member located in said conduit means and hydraulically connected to said conduit means so as to assume a normal position when the pressure in said conduit means is normal corresponding to a desired speed of said shaft and of said pump, and so as to assume control positions reducing or increasing the cross section of said conduit means when the pressure in said conduit means increases or decreases, respectively, corresponding to undesired speed variations of said shaft and of said pump whereby the pressure acting on said pressure responsive control element is more rapidly increased, or decreased, respectively, than the pressure produced in said conduit means by said pump due to speed variations of said shaft so that the output torque is rapidly increased, or decreased, by said adjusting means when the speed of said shaft varies due to load variations.

7. A drive system comprising, in combination, prime mover means including rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough and including a pressure conduit, a discharge conduit and a tank; a pressure responsive control element connected to said adjusting means and communicating with said pressure conduit of said conduit means so that said adjusting means and thereby said output means are adjusted in accordance with the pressure in said conduit means; an operating valve in said discharge conduit of said conduit means and manually adjustable between a plurality of operative positions corresponding to different selected speeds of said shaft, said operating valve changing the cross section of said discharge conduit of said conduit means in said operative positions for producing corresponding normal pressures at said pressure responsive control element; and control means including a control valve member located in said discharge conduit of said conduit means downstream of said operating valve, and pressure responsive means hydraulically connected to said pressure conduit of said conduit means and controlling said control valve member to assume a normal position when the pressure in said conduit means is normal corresponding to a desired speed of said shaft and of said pump, and so as to assume control positions further gradually reducing or increasing the pressure in said conduit means when the pressure in said conduit means increases or decreases, respectively, corresponding to undesired speed variations of said shaft and of said pump whereby the pressure acting on said pressure responsive control element is more rapidly increased, or decreased, respectively, than the pressure produced in said conduit means by said pump due to speed variations of said shaft so that the output torque is rapidly increased, or decreased, by said adjusting means when the speed of said shaft varies due to load variations whereby the output speed of said output means is maintained substantially continuously constant.

8. A drive system comprising, in combination, drive means including rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the pressure in said conduit means; an operating valve in said conduit means intermediate said pump and said pressure responsive control element and adjustable between a plurality of operative positions corresponding to different selected speeds of said shaft, said operating valve changing the cross section of said conduit means in said operative positions for producing corresponding normal pressures at said pressure responsive control element; a valve element located in said conduit means and being movable between a normal position and a plurality of control positions for reducing or increasing the pressure in said conduit means; a control device including a first member driven from said shaft to rotate at a speed corresponding to the speed of the same, and a second rotary member actuated by said first member to turn in opposite directions when the speed of said shaft is above or below a desired normal speed, said second member being connected to said valve element for moving the same to said control positions for increasing or decreasing, respectively, the pressure in said conduit means when the speed of said shaft increases or decreases, respectively, whereby the pressure acting on said pressure responsive control element is more rapidly increased, or decreased, respectively, than the presure produced in said conduit means by said pump due to speed variations of said shaft so that the output torque is rapidly increased by said adjusting means when the speed of said shaft varies due to load variations.

9. A drive system comprising, in combination, drive means including rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a bypass conduit connecting inlet and outlet of said pump; a pressure responsive control element connected to said adjusting means and communicating with said conduit means so that said adjusting means and thereby said output means are adjusted in accordance with the pressure in said conduit means; an operating valve in said conduit means intermediate said pump and said pressure responsive control element and adjustable between a plurality of operative positions corresponding to different selected speeds of said shaft, said operating valve changing the cross section of said conduit means in said operative positions for producing corresponding normal pressures at said pressure responsive control element; a valve element located in said by-pass conduit of said conduit means and being movable between a normal position and a plurality of control positions for reducing or increasing the cross section of said by-pass conduit for increasing or decreasing, respectively, the pressure in said conduit means; a control device including a first member driven from said shaft to rotate at a speed corresponding to the speed of the same, and a second rotary member actuated by said first member to turn in opposite directions when the speed of said shaft is above or below a desired normal speed, said second member being connected to said valve element for moving the same to said control positions for increasing or decreasing, respectively, the pressure in said conduit means when the speed of said shaft increases or decreases, respectively, whereby the pressure acting on said pressure responsive control element is more rapidly increased, or decreased, respectively, than the pressure produced in said conduit means by said pump due to speed variations of said shaft so that the output torque is rapidly increased, or decreased by said adjusting means when the speed of said shaft varies due to load variations.

10. A drive system comprising, in combination, prime mover means; drive means including fluid impelling input means driven by said prime mover means, turbine means having rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the pressure in said conduit means; a valve element located in said conduit means and being movable between a normal position and a plurality of control positions for reducing or increasing the pressure in said conduit means; a synchronous motor having a first member driven from said drive shaft to rotate at a speed corresponding to the speed of the same while producing a rotary field rotating at a constant speed relative to said first member and in a direction opposite to the direction of rotation of said shaft, and a second member turning at a speed corresponding to the absolute speed of said rotary field in opposite directions when the speed of said shaft is above or below a desired normal speed equal, but opposite, to the constant speed of said rotary field, said second member being connected to said valve element for moving the same to said control positions for increasing or decreasing, resepectively, the pressure in said conduit means when the speed of said shaft increases or decreases, respectively, whereby the pressure acting on said pressure responsive control element is more rapidly increased, or decreased, respectively, than the pressure produced in said conduit means by said pump due to speed variations of said shaft so that the output torque is rapidly increased, or decreased by said adjusting means when the speed of said shaft varies due to load variations.

11. A drive system comprising, in combination; drive means including rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the pressure in said conduit means; an operating valve in said conduit means intermediate said pump and said pressure responsive control element and adjustable between a plurality of operative positions corresponding to different selected speeds of said shaft, said operating valve changing the cross section of said conduit means in said operative positions for producing corresponding normal pressures at said pressure responsive control element; a valve element located in said conduit means and being movable between a normal position and a plurality of control positions for reducing or increasing the pressure in said conduit means; a synchronous motor having a first member driven from said drive shaft to rotate at a speed corresponding to the speed of the same while producing a rotary field rotating at a constant speed corresponding to a desired speed of said shaft relative to said first member and in a direction opposite to the direction of rotation of said shaft, and a second member turning at a speed corresponding to the absolute speed of said rotary field in opposite directions when the speed of said shaft is above or below a desired normal speed equal, but opposite, to the constant speed of said rotary field, said second member being connected to said valve element for moving the same to said control positions for increasing or decreasing, respectively, the pressure in said conduit means when the speed of said shaft increases or decreases, respectively, whereby the pressure acting on said pressure responsive control element is more rapidly increased, or decreased, respectively, than the pressure produced in said conduit means by said pump due to speed variations of said shaft so that the output torque is rapidly increased, or decreased by said adjusting means when the speed of said shaft varies due to load variations.

12. A drive system comprising, in combination, prime mover means; drive means including fluid impelling input means driven by said prime mover means, turbine means having rotary output means, and adjusting means for adjusting the output torque of said output means; a shaft driven by said output means and adapted to drive a machine subjected to a variable load; a pump driven from said shaft; conduit means connected to said pump so that a liquid is circulated therethrough; a pressure responsive control element connected to said adjusting means and communicating with said conduit means so that said adjusting means and thereby said output means are adjusted in accordance with the presssure in said conduit means; a valve element located in said conduit means and being movable between a normal position and a plurality of control positions for reducing or increasing the pressure in said conduit means; a synchronous motor having a first member driven from said drive shaft to rotate at a speed corresponding to the speed of the same while producing a rotary field rotating at a constant speed corresponding to a desired speed of said shaft relative to said first member and in a direction opposite to the direction of rotation of said shaft, and a second member turning at a speed corresponding to the absolute speed of said rotary field in opposite directions when the speed of said shaft is above or below a desired normal speed equal, but opposite, to the constant speed of said rotary field, said second member being connected to said valve element for moving the same to said control positions for increasing or decreasing, respectively, the pressure in said conduit means when the speed of said shaft increases or decreases, respectively; and control valve means including a control valve member located in said conduit means and hydraulically connected to said conduit means so as to assume a normal position when the pressure in said conduit means is normal corresponding to a desired speed of said shaft and of said pump, and so as to assume control positions further reducing or increasing the pressure in said conduit means when the pressure in said conduit means increases or decreases, respectively, corresponding to undesired speed variations of said shaft and of said pump, whereby the pressure acting on said pressure responsive control element is more rapidly increased, or decreased, respectively, than the pressure produced in said conduit means by said pump due to speed variations of said shaft so that the output torque is rapidly increased, or decreased by said adjusting means when the speed of said shaft varies due to load variations.

References Cited by the Examiner

UNITED STATES PATENTS

| | | | |
|---|---|---|---|
| 2,291,011 | 7/42 | Vickers | 60—53 |
| 2,382,034 | 8/45 | Wemp | 60—54 |
| 2,492,720 | 12/49 | Tyler | 60—53 |
| 2,505,727 | 4/50 | Vickers et al. | 60—53 X |
| 2,739,447 | 3/56 | Newell | 60—53 |
| 2,768,636 | 10/56 | Postel et al. | 60—53 X |
| 2,805,549 | 9/57 | Hensleigh et al. | 60—54 |

JULIUS E. WEST, *Primary Examiner.*